US010055628B2

(12) United States Patent
Gonzalez et al.

(10) Patent No.: US 10,055,628 B2
(45) Date of Patent: Aug. 21, 2018

(54) DETECTING ITEM SCANS WITH AUDIO SIGNAL PROCESSING

(71) Applicant: Amazon Technologies, Inc., Seattle, WA (US)

(72) Inventors: Ivan Eduardo Gonzalez, San Francisco, CA (US); Anjaneya Varma Alluri, Los Angeles, CA (US); Jordan Bubica, Los Angeles, CA (US); Vamshi Mannam, Irvine, CA (US); Dhaval Parekh, Union City, CA (US); Derek Andrew Scholten, Long Beach, CA (US); Fengliang Xu, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/257,357

(22) Filed: Sep. 6, 2016

(65) Prior Publication Data

US 2018/0068143 A1 Mar. 8, 2018

(51) Int. Cl.
*G06F 17/00* (2006.01)
*G06K 7/10* (2006.01)
*G10L 19/018* (2013.01)
*G06Q 30/06* (2012.01)
(Continued)

(52) U.S. Cl.
CPC ..... *G06K 7/10861* (2013.01); *G06Q 20/3274* (2013.01); *G06Q 30/0617* (2013.01); *G06Q 30/0633* (2013.01); *G07G 1/0045* (2013.01); *G10L 19/018* (2013.01); *G06K 2007/10524* (2013.01)

(58) Field of Classification Search
CPC ....... G06Q 20/18; G06Q 20/20; E04H 1/1222
USPC ..... 705/26.8, 26.81, 64, 65, 67, 380; 700/94
See application file for complete search history.

(56) References Cited

U.S. PATENT DOCUMENTS

| 5,839,104 A * | 11/1998 | Miller ............... A47F 9/046 704/251 |
| 2008/0035734 A1 * | 2/2008 | Challa ............... G06K 7/10 235/462.46 |
| 2012/0205433 A1 | 8/2012 | Dudek et al. |

(Continued)

FOREIGN PATENT DOCUMENTS

WO 2015008156 A2 1/2015

OTHER PUBLICATIONS

International Search Report dated Nov. 8, 2017 for PCT/US2017/048996.

*Primary Examiner* — Akelaw Teshale
(74) *Attorney, Agent, or Firm* — Thomas | Horstemeyer, LLP (57) ABSTRACT

Disclosed are various embodiments for detecting item scans with audio signal processing. A first machine-readable identifier may be rendered in a display device associated with at least one computing device, where the first machine-readable identifier is associated with a first item in a list of items. An audio signal may be captured using a microphone and analyzed to identify a predetermined tone in the audio signal indicative of a scan being performed on a register device. In response to the predetermined tone in the audio signal being identified, the first machine-readable identifier may be replaced with a second machine-readable identifier in the display device, where the second machine-readable identifier is associated with a second item in the list of items.

20 Claims, 8 Drawing Sheets

(51) Int. Cl.
  *G07G 1/00*     (2006.01)
  *G06Q 20/32*    (2012.01)

(56) References Cited

U.S. PATENT DOCUMENTS

| | | | |
|---|---|---|---|
| 2013/0124362 A1* | 5/2013 | Katcher | G06Q 30/0633 |
| | | | 705/26.8 |
| 2014/0089116 A1* | 3/2014 | Argue | G06Q 30/0268 |
| | | | 705/21 |
| 2014/0359471 A1 | 12/2014 | Roundtree et al. | |
| 2015/0120573 A1* | 4/2015 | Xia | G06Q 20/38215 |
| | | | 705/73 |
| 2016/0049163 A1* | 2/2016 | Ioannidis | G10L 25/48 |
| | | | 705/14.49 |

* cited by examiner

DETECTING ITEM SCANS WITH AUDIO SIGNAL PROCESSING

BACKGROUND

Delivery services now exist that allow an end user to order items from local restaurants, grocery stores, hardware stores, or other similar establishments. For example, a user may order items through a software application where an agent associated with the software application will travel to a local establishment, purchase the items on behalf of the user, and deliver the items to the user. However, the agent is required to perform a checkout process where a cashier or other employee physically scans each item subject to the order. Time is thus lost when fulfilling the order.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to detecting item scans with audio signal processing, for example, to optimize a checkout process. Some electronic commerce systems may offer items to a customer for purchase, where fulfillment of the items requires an agent visiting a local store, shopping for the items ordered by the customer, and delivering the items. These agents are traditionally required to perform a checkout process where a cashier or other employee physically scans each item subject to the order, similar to a normal customer of the establishment. Crucial time in fulfilling the order is lost. For example, the traditional way of taking items out of a shopping cart or basket, placing the items on a conveyor, and patiently waiting while a store employee scans each item increases delivery time impacts the quality of the fulfillment service.

According to various embodiments herein, a client device owned or operated by the agent may be utilized to speed up the checkout process. To this end, a client application executed by a client device may provide an agent with a list of items to purchase or otherwise collect from a store or other environment when fulfilling an online order. The list of items may include, for example, groceries, household products, or other items collected from a grocery store, hardware store, or other environment where a checkout process may be required.

Once one or more items in the list are collected, a checkout process may be optimized using the client device or other type of mobile computing device. According to various embodiments described herein, the client application may generate or display a machine-readable identifier, such as a matrix code, barcode, or tag code, for each of the items during the checkout process, allowing the machine-readable identifier to be scanned by an electronic cash register or a handheld reader. Hence, each of the items collected by the agent does not require removal from a cart or basket. Additionally, each of the items does not need to be physically scanned.

In some embodiments, a machine-readable identifier for an item may be shown in a display until a predetermined tone has been detected by the client device. For example, a microphone of the client device may be configured to collect audio information during the checkout process, or while a machine-readable identifier is shown on the display. The client application may analyze the audio information to detect the presence of the predetermined tone. Once identified, a machine-readable identifier shown in the display can be replaced with another for the next item subject to the checkout process. The checkout process can continue until all items subject to the checkout process have been scanned.

In the following discussion, a general description of a system for detecting item scans with audio signal processing and its components is provided, followed by a discussion of the operation of the same.

Figure 1A:
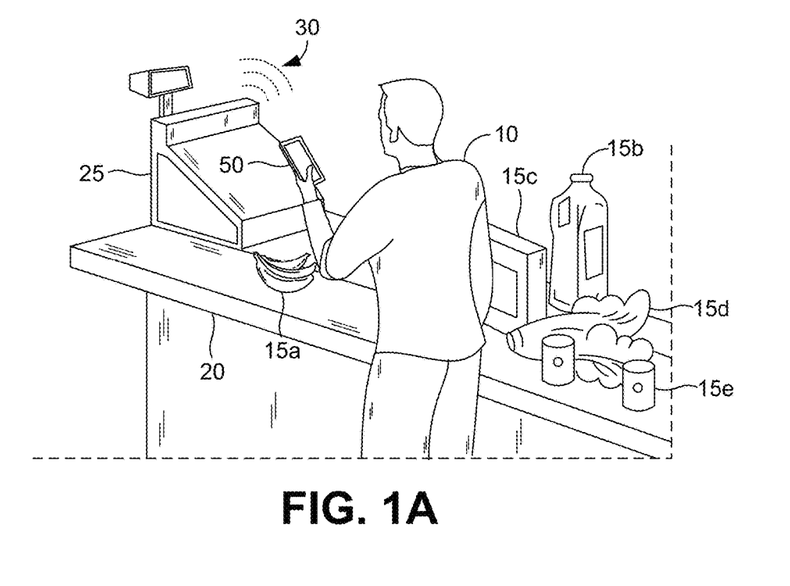
FIGS. 1A and 1B are drawings depicting an optimized checkout process performed using a client device according to various embodiments of the present disclosure.

With reference to FIG. 1A, a person 10 is shown participating in a traditional checkout process where items 15a . . . 15e (collectively "items 15") collected by the person 10 are placed on a counter 20 or conveyer belt at a checkout location. A traditional checkout process requires a cashier or other employee of the establishment to scan each item 15 using some form of a reader device, such as a handheld barcode reader or a barcode reader built into an electronic cash register 25.

Traditionally, electronic cash registers 25 are known to emit a tone 30, such as a beep or other sound, so that the cashier knows that an item 15 has been successfully scanned. Thereafter, the cashier places the item 15 in a bag or returns the item 15 to the person 10, and proceeds to scan the next item 15. According to various embodiments, a client device 50 may be utilized to optimize the checkout process, as will be described.

Figure 1B:
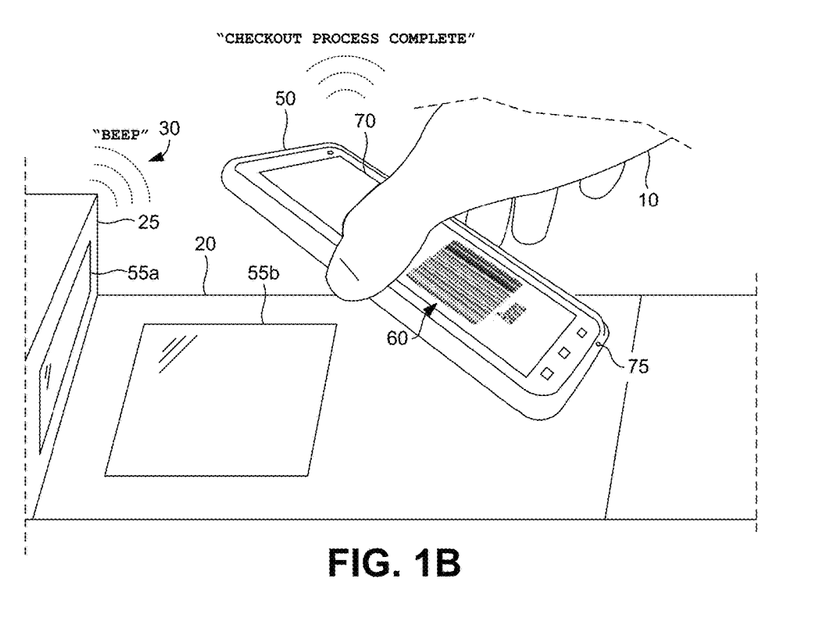

Moving on to FIG. 1B, an example barcode scanner for an electronic cash register 25 is shown according to various embodiments. In some examples, an electronic cash register 25 may include one or more counter scanners 55a . . . 55b (collectively "counter scanners 55") configured to read a barcode when placed on appropriate areas of the counter 20. For example, a counter scanner 55 may include a glass panel with a barcode reader disposed underneath that projects a laser or other device to scan a barcode or other form of machine-readable identifier.

To speed up a checkout process at the electronic cash register 25, the client device 50 may be utilized. According to various embodiments described herein, the client device 50 may generate machine-readable identifiers 60 on a display 70 of the client device 50, which can be scanned in place of, and in the same manner as, product labels. The machine-readable identifier may include, for example, a matrix code, barcode, tag code, or other similar identifier. In some embodiments, a machine-readable identifier 60 is generated for an item subject to the checkout process until the tone 30 emitted by the electronic cash register 25 is detected. To this end, a microphone 75 of the client device 50 may capture audio during the checkout process while the client device 50 analyzes the audio for the presence of a tone 30. Thereafter, a machine-readable identifier 60 being shown in the display may be replaced with another machine-readable identifier 60 until all items subject to the checkout process have been scanned by the electronic cash register 25.

In some embodiments, the client device 50 may be placed face down on a counter scanner 55, where the display 70 faces a surface of the counter scanner 55. As a result, the client device 50 may generate and display machine-readable identifiers 60 for the items on a one-by-one basis without user interaction or the client device 50 having to be moved. In some embodiments, when all machine-readable identifiers 60 have been scanned, as detected by the client device 50, the client device 50 may play a sound, vibrate, or perform another action such that a cashier or other person 10 knows that the client device 50 can be removed from the surface of the counter scanner 55.

In some embodiments, a machine-readable identifier for an item may be shown until a predetermined tone has been detected by the client device. For example, a microphone of the client device may be configured to collect audio information during the checkout process, or while a machine-readable identifier is shown on the display. The client application may analyze the audio information to detect the presence of the predetermined tone emitted by the counter scanner 55 or electronic cash registers 25. Once identified, a machine-readable identifier shown in the display can be replaced with another for the next item subject to the checkout process. The checkout process can continue until all items subject to the checkout process have been scanned.

Figure 2:
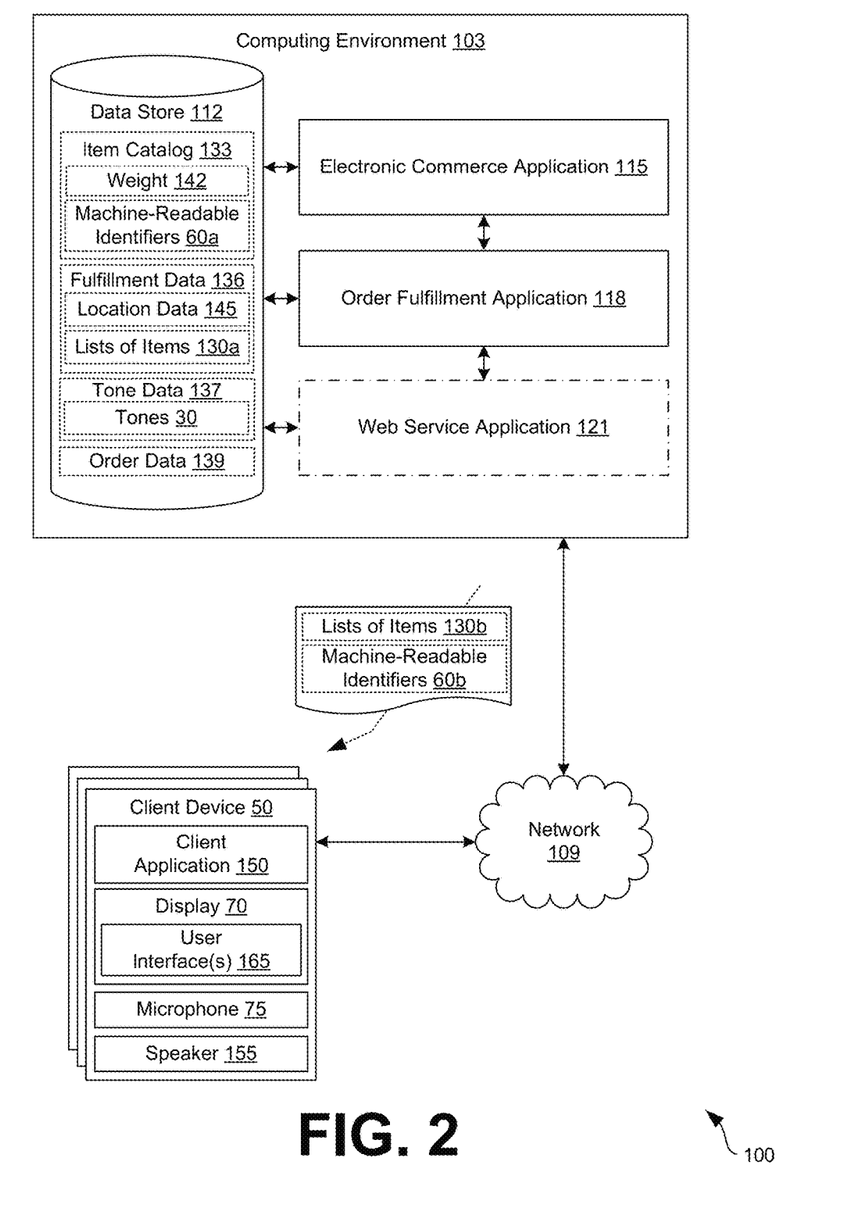
FIG. 2 is a drawing of a networked environment according to various embodiments of the present disclosure.

With reference to FIG. 2, shown is a networked environment 100 according to various embodiments. The networked environment 100 includes a computing environment 103 and the client device 50, which are in data communication with each other via a network 109. The network 109 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include an electronic commerce application 115, an order fulfillment application 118, a web service application 121, and other applications, services, processes, systems, engines, or functionality not discussed in detail herein.

The electronic commerce application 115 is executed in order to facilitate the online purchase of items 15 over the network 109. The electronic commerce application 115 also performs various backend functions associated with the online presence of a merchant in order to facilitate the online purchase of items 15 as will be described. For example, the electronic commerce application 115 generates network pages, such as web pages or other types of network content, that are provided to client devices 50 for the purposes of selecting items for purchase, rental, download, lease, or other form of consumption.

The order fulfillment application 118 is executed to facilitate delivery of items 15 ordered through the electronic commerce application 115. The order fulfillment application 118 may oversee assigning an order to an agent. An agent may include an individual that travels to an establishment, purchases items 15 specified in an order, and delivers the items 15 to a delivery address. In one embodiment, the order fulfillment application 118 may generate a list of items 130a . . . 130b to be communicated to a client device 50 for the agent. The list of items 130 may provide the agent with the items 15 to be purchased and delivered.

The web service application 121 is executed to provide a medium for communication between the computing environment 103 and the client devices 106 over the network 109. The web service application 121 may comprise a web-based application programming interface (API) embodied in software that facilitates programmatic service calls (or API calls) made by a client application to communicate with the components of the computing environment 103, such as the electronic commerce application 115, the order fulfillment application 118, or other services or applications not described herein. According to various embodiments, the web-based API may further comprise a representational state transfer (REST) API, a simple object access protocol (SOAP) API, or another suitable API. Programmatic service calls may be performed using a hypertext transfer protocol (HTTP), a secure hypertext transfer protocol (HTTPS), or other similar protocol.

The data stored in the data store 112 includes, for example, an item catalog 133, fulfillment data 136, tone data 137, order data 139, and potentially other data. The item catalog 133 may include information associated with items 15, products, goods, and so on, that may be offered for order by way of the electronic commerce application 115 and the order fulfillment application 118. The information associated with items 15 may include, for example, a name, weight 142, description, price, genre, subgenre, category, image, tax category, option, shipping category, and so on. The electronic commerce application 115 may access the item catalog 133 when serving up network content to the client devices 106.

The fulfillment data 136 may include information used to assign an agent to an order or assist the agent in fulfilling an order. Such information can include location data 145 that may be used to route the agent to a particular store or other like establishment to purchase items 15 subject to an order. The fulfillment data 136 may also include the list of items 130 to provide to the agent for fulfillment.

The tone data 137 may include information used to detect tones 30 emitted from cash registers or similar devices. To this end, the tone data 137 may include a library of common tones 30 based on popular cash registers. Additionally, the tone data 137 may include information used to programmatically compare an audio sample captured by a client device 50 to a tone 30 in the data store 112. For a given tone 30, the tone data 137 may include a sample rate, a signal frequency, signal amplitude data, phase data, fast Fourier transform (FFT) data, time-domain signal data, frequency-domain signal data, or other similar information.

The client device 50 is representative of a plurality of client devices that may be coupled to the network 109. The client device 50 may comprise, for example, a processor-based system such as a computer system. Such a computer system may be embodied in the form of a laptop computer, personal digital assistants, cellular telephones, smartphones, music players, web pads, tablet computer systems, electronic book readers, or other devices with like capability. The client device 50 may include a microphone 75, a speaker 155, and a display 70. The display 70 may comprise, for example, one or more devices such as liquid crystal display (LCD) displays, gas plasma-based flat panel displays, organic light emitting diode (OLED) displays, electrophoretic ink (E ink) displays, or other types of display devices, etc.

The client device 50 may be configured to execute various applications such as a client application 150 and/or other applications. The client application 150 may be executed in a client device 50, for example, to access network content served up by the computing environment 103, or other servers, thereby rendering a user interface 165 on the display 70. To this end, the client application 150 may comprise, for example, a browser, a dedicated application, etc., and the user interface 165 may comprise a network page, an application screen, etc. The client device 50 may be configured to execute applications beyond the client application 150 such as, for example, email applications, social networking applications, word processors, spreadsheets, and/or other applications.

Next, a general description of the operation of the various components of the networked environment 100 is provided. To begin, it may be assumed that a user of the electronic commerce application 115 has made an order for one or more items 15 that require an agent to visit an establishment local to the user to purchase the items 15 and subsequently deliver the items 15. The order fulfillment application 118 may identify an agent to fulfill the order and provide the agent, for example, with the list of items 130 subject to the order. Additionally, the order fulfillment application 118 may provide the agent with an establishment to purchase the items 15, directions to the establishment, delivery directions, or other information.

As the items are not being fulfilled from a warehouse or similar entity, the agent may be required to go to a retail establishment, pick items 15 from their inventory locations, and carry or otherwise deliver the items 15 to a checkout location to pay for the items 15. A traditional checkout process may require a cashier or other employee of the establishment to scan each item 15 using a handheld reader or a counter scanner 55, as shown in FIG. 1B.

To speed up the checkout process at an electronic cash register 25, the client device 50 may be utilized. Machine-readable identifiers 60 may be generated for the items 15 to scan, as opposed to scanning labels affixed to the items 15. In some embodiments, the machine-readable identifiers 60 may be generated remotely by the computing environment 103 and communicated to the client device 50. In other embodiments, the machine-readable identifiers 60 are generated locally on the client device 50. In either scenario, the machine-readable identifiers 60 may be generated using a uniform product code (UPC) for an item 15 or other information that causes an electronic cash register 25 to successfully register the item 15 in the checkout process. The machine-readable identifier 60 may be generated to include, for example, a matrix code, barcode, tag code, or other similar identifier capable of being scanned by an electronic cash register 25 or devices associated therewith.

The agent may utilize the client device 50 to pick items 15 in the list of items 130 from their inventory locations and specify, in the client application 150, whether the items 15 were successfully or unsuccessfully fulfilled. For instance, in some situations, an establishment may be out of a particular item 15. Accordingly, the agent may specify which item 15 was not successfully fulfilled such that the item 15 is not part of the checkout process. Once all items 15 available to be fulfilled are collected, the agent may interact with a user interface component, such as a button, to start the checkout process.

The checkout process may include rendering the machine-readable identifiers 60 for each of the items 15 able to be fulfilled on a one-by-one basis until each of the machine-readable identifiers 60 has been scanned by the electronic cash register 25. In some embodiments, a machine-readable identifier 60 is generated for an item 15 until a tone 30 emitted by the electronic cash register 25 is detected. The microphone 75 of the client device 50 may be utilized to capture audio during the checkout process while the client device 50 analyzes the audio for the presence of a tone 30. Thereafter, a machine-readable identifier 60 being shown in the display may be replaced with another machine-readable identifier 60 until all items subject to the checkout process have been scanned by the electronic cash register 25.

In some embodiments, the client device 50 may be placed face down on a counter scanner 55, where the display 70 faces a surface of the counter scanner 55. As a result, the client device 50 may generate machine-readable identifiers 60 for the items 15 without the client device 50 having to be repositioned. In some embodiments, when all machine-readable identifiers 60 have been scanned, as detected by the client device 50, the client device 50 may play a sound using the speaker 155 of the client device 50, vibrate, illuminate a front- or rear-facing light emitting diode (LED), or perform another action such that a cashier or other person 10 knows that the client device 50 can be removed from the surface of the counter scanner 55.

Figure 3:
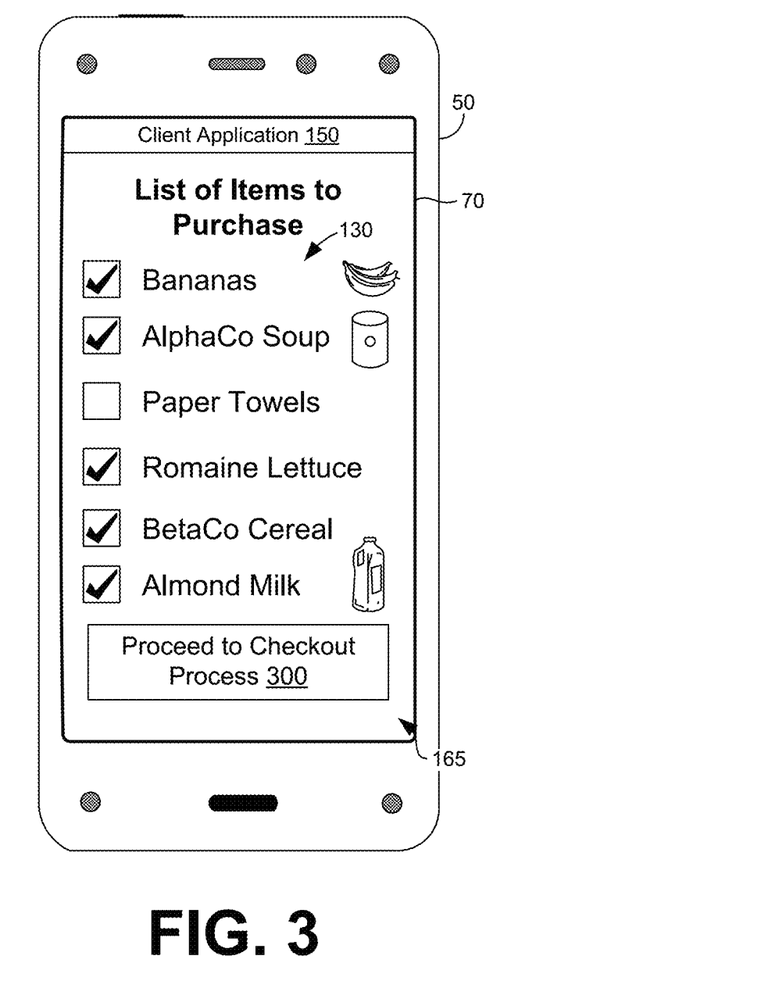
FIG. 3 is an example user interface rendered by a client device in the networked environment of FIG. 2 according to various embodiments of the present disclosure.

Referring next to FIG. 3, shown is an embodiment of a user interface 165 being rendered in a display 70 of a client device 50. Assuming an order for one or more items 15 has been made that requires an agent to visit an establishment local to the user to purchase the items 15 and subsequently deliver the items 15, the order fulfillment application 118 may provide the agent with a list of items 130 to fulfill the order. The client application 150 may facilitate directing the agent to particular inventory locations, as may be appreciated, The list of items 130 may be provided in association with a checklist or other suitable user interface components that allow the agent to specify which items 15 in the list of items 130 have been successfully picked from their inventory locations and which items 15 are not able to be fulfilled. For instance, in some situations, an establishment may be out of a particular item 15. Accordingly, the agent may specify which item 15 was not successfully located or fulfilled such that the item 15 is not part of the checkout process. In the non-limiting example of FIG. 3, a checkbox for "Paper Towels" is not checked, thereby indicating that the agent has not (or is unable) to locate the item. As a result, no machine-readable identifiers 60 for paper towels will be generated or shown during the checkout process. Once all items 15 available to be fulfilled are collected, the agent may interact with a user interface component 300, such as a button or a hyperlink, to start a checkout process.

Figure 4A:
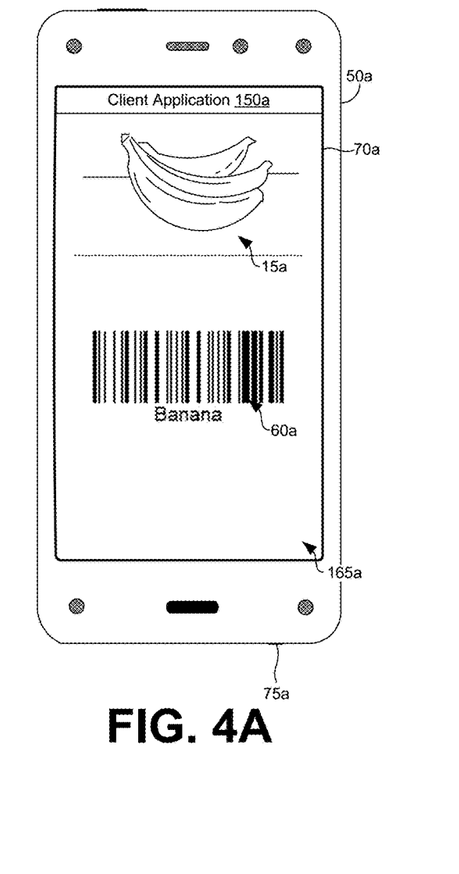
FIGS. 4A and 4B are example user interfaces rendered by the client device in the networked environment of FIG. 2 according to various embodiments of the present disclosure.
Figure 4B:
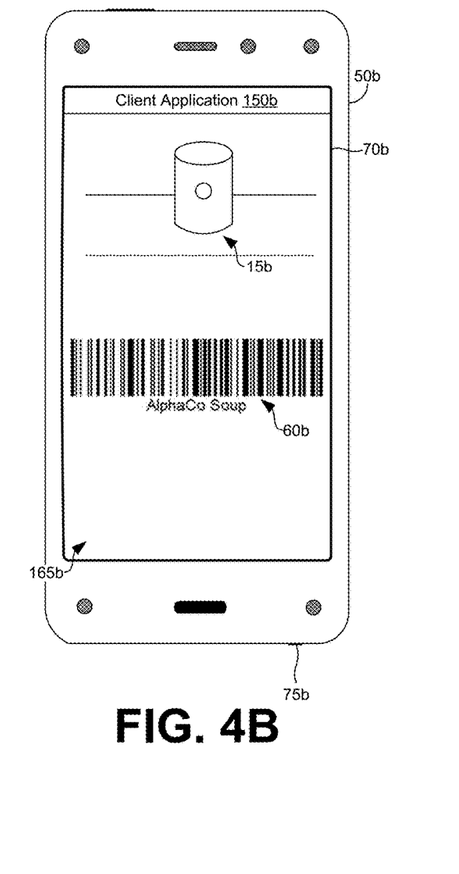

Turning now to FIGS. 4A and 4B, shown are examples of user interfaces 165a . . . 165b rendered in a display 70a . . . 70b of the client device 50a . . . 50b during a checkout process. The checkout process may include rendering the machine-readable identifiers 60a . . . 60b for each of the items 15a . . . 15b able to be fulfilled on a one-by-one basis until each of the machine-readable identifiers 60 has been scanned by the electronic cash register 25. For example, the machine-readable identifier 60a for a banana may be generated until a tone 30 emitted by an electronic cash register 25 is detected by the microphone 75a . . . 75b. Thereafter, the machine-readable identifier 60a for the banana may be replaced with another machine-readable identifier 60b for a can of "AlphaCo Soup." This may continue until all items subject to the checkout process have been scanned by the electronic cash register 25.

The client application 150 may optimize display of the machine-readable identifiers 60 such that, when the client device 50 is placed face down on a counter scanner 55, the machine-readable identifiers 60 are easily detectable. To this end, the client application 150 may scale, rotate, or otherwise reposition the machine-readable identifiers 60 based on an orientation of the client device 50 relative to the counter scanner 55.

Figure 5:
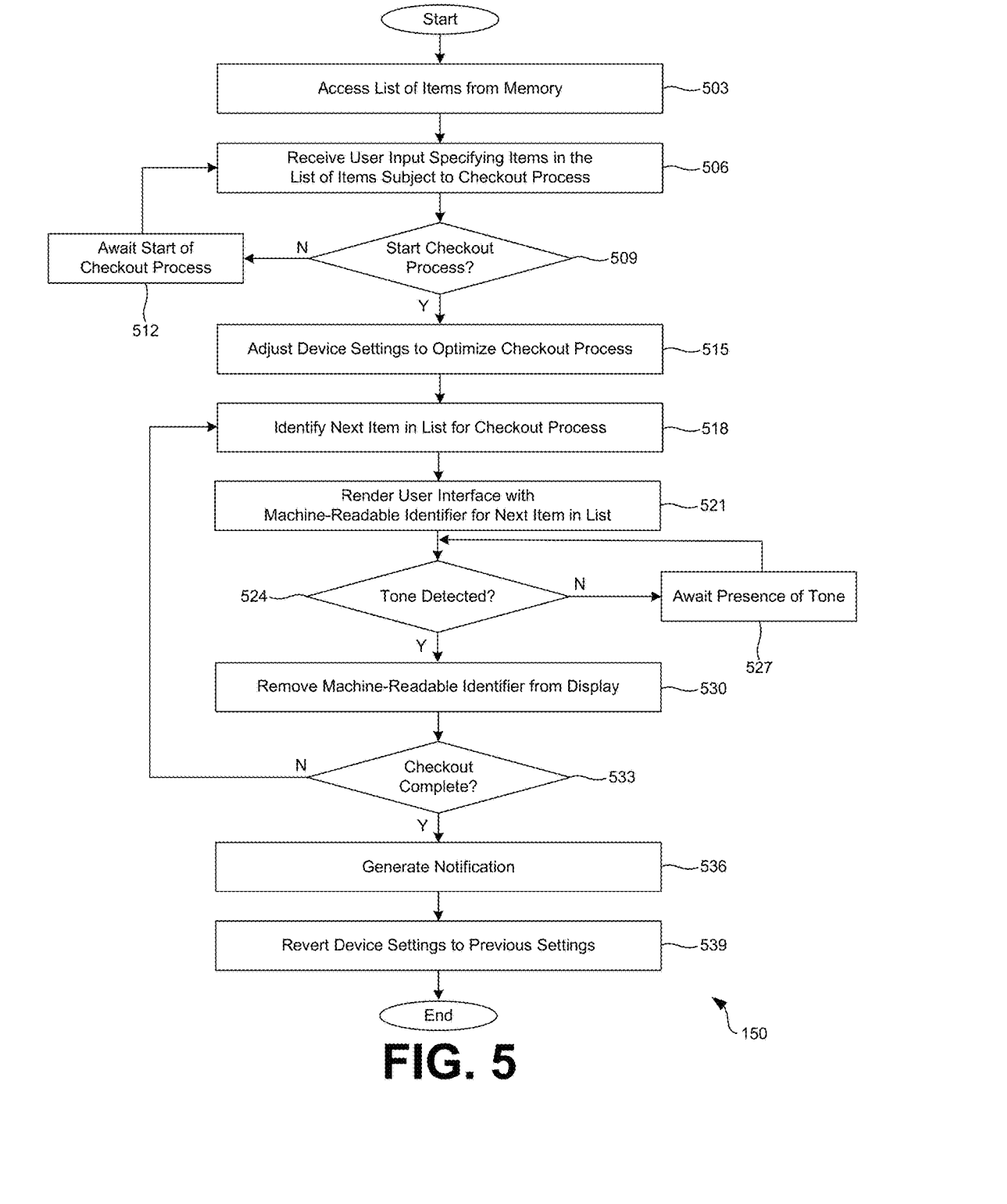
FIG. 5 is a flowchart illustrating example functionality of a client application executed the client device in the networked environment of FIG. 2 according to various embodiments of the present disclosure.

Referring next to FIG. 5, shown is a flowchart that provides one example of the operation of the client application 150 according to various embodiments. It is understood that the flowchart of FIG. 5 provides merely an example of the many different types of functional arrangements that may be employed to implement the operation of the client application 150 as described herein. As an alternative, the flowchart of FIG. 5 may be viewed as depicting an example of elements of a method implemented in the client device 50 according to one or more embodiments.

Assuming a user of the electronic commerce application 115 has made an order for one or more items 15, an agent may visit an establishment, such as a grocery store, to purchase and deliver the items 15. However, participating in a traditional checkout process costs a substantial amount of time, as a cashier must scan a label for each item 15 using a handheld reader or a counter scanner 55. To reduce an amount of time to perform a checkout process at an electronic cash register 25, the client device 50 may be utilized.

Starting with 503, the client application 150 may access a list of items 130 from memory, where the list of items 130 includes items 15 to be picked from inventory locations and transferred to a checkout location for payment. Next, in 506, user input may be received that specifies each of the items 15 in the list of items 130 subject to the checkout process. For example, the agent may specify which items 15 could be successfully picked from inventory locations while specifying which items 15 were out of stock or otherwise unable to be purchased.

Next, in 509, the client application 150 may determine whether to start the checkout process. In some embodiments, the checkout process may start automatically if a user has specified that all items 15 in a list of items 130 have been picked. In another embodiment, the agent manipulates a user interface component 300 to start the checkout process. In further embodiments, the client application 150 may utilize one or more accelerometers or gyroscopes of the client device 50 to detect an orientation of the device indicating that the client device 50 is in a face down position, for example, on a surface of the counter scanner 55.

If the checkout process is not started, the process may proceed to 512 to await the start of the checkout process. Thereafter, the process may return to 506 to continue receiving user input pertaining to the items 15 in the list of items 130. Alternatively, if the checkout process has started, the process may proceed to 515 where device settings may be adjusted to optimize the checkout process.

In various embodiments, adjusting settings on the client device 50 may include, for example, adjusting a luminous intensity (or brightness level) of the display 70, adjusting microphone gain for the microphone 75, disabling an automatic display turn-off timer, or configuring any other setting on the client device 50. Prior to adjusting the settings on the client device 50, the client application 150 may store a current configuration of the device settings, so that the client device 50 can be adequately reconfigured after completion of the checkout process.

In 518, a next item 15 in the list of items 130 is identified for the checkout process. Next, in 521, a user interface 165 is generated and rendered in the display 70, where the user interface 165 includes a machine-readable identifier 60 associated with the item 15 identified in 518. If the item 15 is the first item 15 in the list of items 130, the client device 50 can be placed down on a counter scanner 55 such that the display 70 of the client device 50 comes into contact with or faces a surface of the counter scanner 55. As may be appreciated, the counter scanner 55 may scan the machine-readable identifier 60 shown in the display 70.

In some embodiments, the machine-readable identifiers 60 are generated by the client application 150 locally on the client device 50. In other embodiments, the machine-readable identifiers 60 are generated remotely by the computing environment 103 and received by the client device 50. The machine-readable identifier 60 may include, for example, a matrix code, barcode, tag code, or other similar identifier capable of being scanned by an electronic cash register 25 or devices associated therewith.

Various mechanisms may be employed to transition from a machine-readable identifier 60 currently shown in the display to a machine-readable identifier 60 for another item 15 in the list of items 130. For instance, in some embodiments, the transition may be automatically performed after a predetermined delay (e.g., five seconds). In other embodiments, the client device 50 may analyze sensor data captured by at least one sensor of the client device 50 to determine whether the machine-readable identifier 60 has been read by an external device, such as a counter scanner 55 or other form of barcode scanner. This may include, for example, determining whether a tone 30 has been emitted by an external device using a microphone 75 of the client device 50. Hence, in 524, the client application determines whether a tone 30 emitted by the electronic cash register 25 or a peripheral device associated therewith has been sensed. To this end, the microphone 75 of the client device 50 may be utilized to capture audio during the checkout process while the client device 50 analyzes the audio for the presence of a tone 30.

In some embodiments, an audio signal captured by the microphone 75 is converted to a fingerprint and compared to fingerprints for tones 30 stored on the client device 50 or remotely in the computing environment 103. In one example, the audio signal may be analyzed and fingerprinted in the frequency domain. To this end, the audio signal may be converted from the time domain to the frequency domain by applying a discrete Fourier transform (FST), such as the FFT. The FFT may be applied using the Cooley-Tukey FFT conversion process, as may be appreciated.

In some embodiments, other detection mechanisms may be employed to identify that a scan of the machine-readable identifier 60 has been performed. For instance, in another embodiment, a camera (e.g., a front facing camera) of the client device 50 can identify a flash or other presence of red light (or other suitable color of light) caused by a barcode scanner when a machine-readable identifier 60 is scanned. In another embodiment, a movement of the client device 50 may be detected using at least one accelerometer or at least one gyroscope of the client device 50. For instance, an employee working an electronic cash register 25 can shake the client device 50 to transition from a first machine-readable identifier 60 to a second machine-readable identifier 60.

If a fingerprint for an audio signal and a fingerprint for a tone 30 match, it may be assumed that the tone 30 has been detected. If no tone is detected, the process may proceed to 527 where the client application 150 continues to analyze the audio signal to await the presence of the tone 30.

In some embodiments, if the tone 30 is not detected within a threshold period of time (e.g., 5 seconds), the optimized setting may be adjusted to attempt to improve the quality of the machine-readable identifier 60 shown in the display 70. For example, the luminous intensity (or brightness level) of the display 70 can be increased or decreased. If a tone 30 is detected in the captured audio signal, the process may proceed to 530 where the machine-readable identifier 60 currently shown in the display 70 may be removed.

Next, in 533, a determination is made whether the checkout process is complete. This may include determining whether additional items 15 in the list of items 130 require scanning. If such items 15 exist, the process may revert to 518 to identify the next item 15 in the checkout process, and so forth. In some scenarios, a counter scanner 55 or other reader device may have mechanisms to prevent a barcode being scanned twice. Thus, in some embodiments, the display 70 of the client device 50 may be turned off for a predetermined amount of time between each display of a machine-readable identifier 60.

In some situations, the agent may have more than a particular type of item. For instance, the agent may have two boxes of the same brand of cereal with the same barcode. Accordingly, in some embodiments, the same machine-readable identifier 60 may be generated during the checkout process more than once or, alternatively, may be kept on a display until multiple tones 30 have been detected.

In further embodiments, the client device 50 can display machine-readable identifiers 60 for other information associated with the checkout process. For example, machine-readable identifiers 60 for a discount card, a coupon, a frequent buyer card, a membership card, gift card, or other type of identifier may be shown in addition to the machine-readable identifiers 60 for the items. The client application 150 may facilitate obtaining an image or other data that can be used to generate a machine-readable identifier 60 for the discount card, coupon, frequent buyer card, membership card, or gift card during the checkout process. Alternatively, these machine-readable identifiers 60 may be provided by an agent or owner of the client device 50, or provided by the computing environment 103 on behalf of the agent.

Conversely, if the checkout process is complete, the process may proceed to 536 where a notification that the checkout process is complete may be generated. This may include, for example, playing a sound using a speaker 155 of the client device 106, causing a vibrating motor in the client device 50 to vibrate, illuminating a front- or rear-facing light emitting diode (LED), or performing another action such that the cashier or agent knows that the client device 50 can be removed.

In 539, the settings for the client device 50 may revert to its original settings or, in other words, the settings that existed before optimization described in 515. Thereafter, the process may proceed to completion. As may be appreciated, in some situations, the flowchart of FIG. 5 may be performed in association with a self-checkout using an electronic cash register 20 operated by the agent, as opposed to a cashier.

Figure 6:
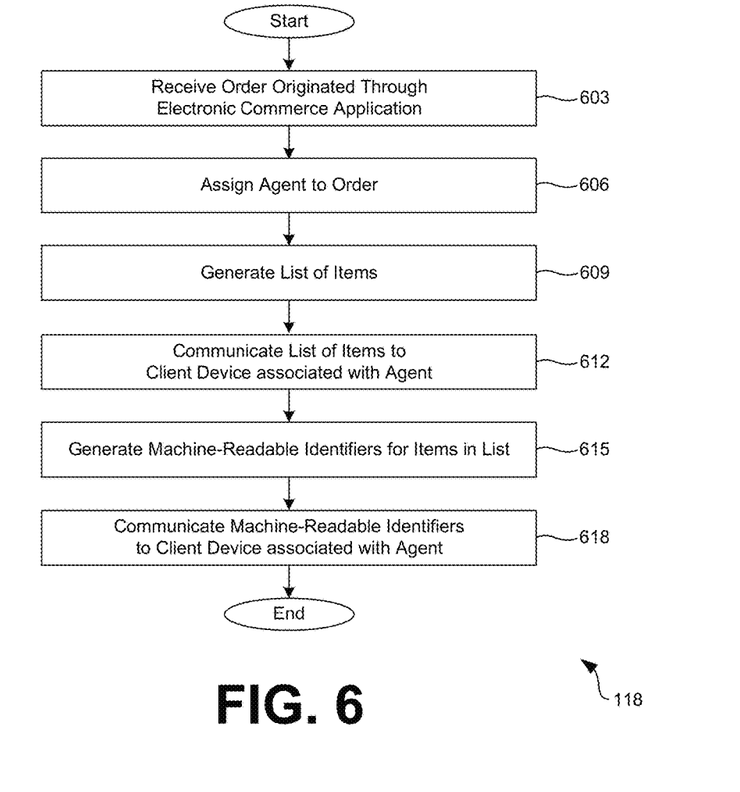
FIG. 6 is a flowchart illustrating example functionality of an order fulfillment application executed a computing environment in the networked environment of FIG. 2 according to various embodiments of the present disclosure.

Turning now to FIG. 6, shown is a flowchart that provides one example of the operation of the order fulfillment application 118 according to various embodiments. It is understood that the flowchart of FIG. 6 provides merely an example of the many different types of functional arrangements that may be employed to implement the operation of the order fulfillment application 118 as described herein. As an alternative, the flowchart of FIG. 6 may be viewed as depicting an example of elements of a method implemented in the computing environment 103 according to one or more embodiments.

Starting with 603, the order fulfillment application 118 may receive an order for items 15 purchased, for example, from the electronic commerce application 115. Next, in 606, the order fulfillment application 118 may assign an agent to the order, where the agent is delegated with the tasks of purchasing the items 15 in a grocery store, hardware store, or other establishment, and delivering the items 15 to a customer.

In 609, the order fulfillment application 118 may generate a list of items 130 based on the order. As may be appreciated, the list of items 130 may include items 15 able to be fulfilled based on a location of a customer, an availability of agents, or other factors. Next, in 612, the list of items 130 may be communicated to the agent. In 615, machine-readable identifiers 60 may be generated for individual items 15 in the list of items 130. In 618, the machine-readable identifiers 60 may be sent to the client device 50 associated with the agent such that the machine-readable identifiers 60 can be used by the client application 150 when carrying out the checkout process.

Figure 7:
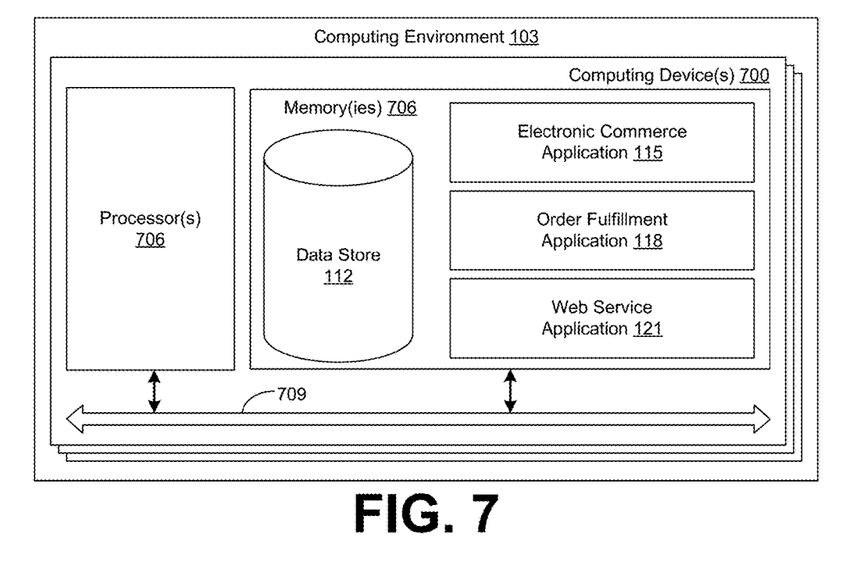
FIG. 7 is a schematic block diagram that provides one example illustration of a computing environment employed in the networked environment of FIG. 2 according to various embodiments of the present disclosure.

With reference to FIG. 7, shown is a schematic block diagram of the computing environment 103 according to an embodiment of the present disclosure. The computing environment 103 includes one or more computing devices 700. Each computing device 700 includes at least one processor circuit, for example, having a processor 703 and a memory 706, both of which are coupled to a local interface 709. To this end, each computing device 700 may comprise, for example, at least one server computer or like device. The local interface 709 may comprise, for example, a data bus with an accompanying address/control bus or other bus structure as can be appreciated.

Stored in the memory 706 are both data and several components that are executable by the processor 703. In particular, stored in the memory 706 and executable by the processor 703 are the electronic commerce application 115, the order fulfillment application 118, the web service application 121, and potentially other applications. Also stored in the memory 706 may be a data store 112 and other data. In addition, an operating system may be stored in the memory 706 and executable by the processor 703.

It is understood that there may be other applications that are stored in the memory 706 and are executable by the processor 703 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 706 and are executable by the processor 703. In this respect, the term "executable" means a program file that is in a form that can ultimately be run by the processor 703. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory 706 including, for example, random access memory (RAM), read-only memory (ROM), hard drive, solid-state drive, USB flash drive, memory card, optical disc, or other memory components.

The memory 706 is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and/or multiple processor cores and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Figure 8:
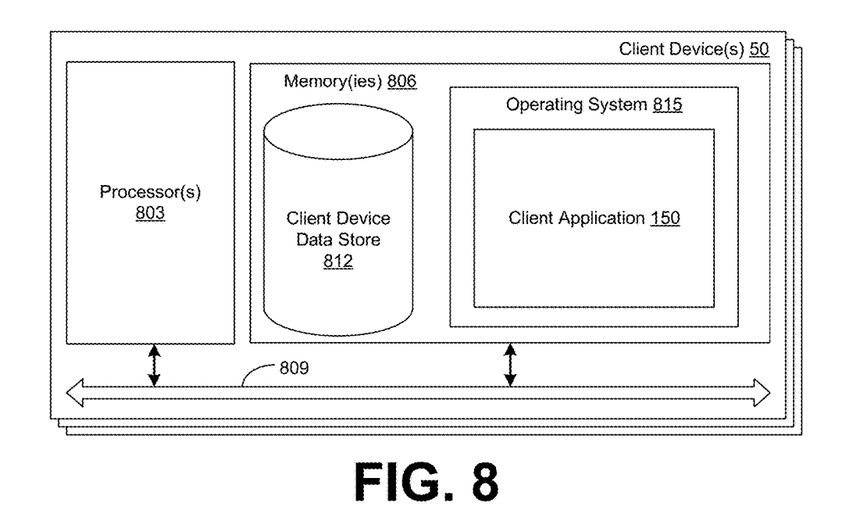
FIG. 8 is a schematic block diagram that provides one example illustration of a client device employed in the networked environment of FIG. 2 according to various embodiments of the present disclosure.

Turning now to FIG. 8, shown is a schematic block diagram of the client devices 50 according to an embodiment of the present disclosure. Each client device 50 includes at least one processor circuit, for example, having a processor 803 and a memory 806, both of which are coupled to a local interface 809. The local interface 809 may comprise, for example, a data bus with an accompanying address/control bus or other bus structure as can be appreciated.

Stored in the memory 806 are both data and several components that are executable by the processor 803. In particular, stored in the memory 806 and executable by the processor 803 is the client application 150, and potentially other applications. Also stored in the memory 806 may be a client device data store 812 and other data. In addition, an operating system 815 may be stored in the memory 806 and executable by the processor 803.

Although the electronic commerce application 115, the order fulfillment application 118, the web service application 121, the client application 150, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 5 and 6 show the functionality and operation of an implementation of portions of the client application 150 and the order fulfillment application 118, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowcharts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. Further, in some embodiments, one or more of the blocks shown in FIGS. 5 and 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 115, the order fulfillment application 118, the web service application 121, and the client application 150, that comprises software or code can be embodied in any non-transitory computer-readable medium for use by or in connection with an instruction execution system such as, for example, a processor 703 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the electronic commerce application 115, the order fulfillment application 118, the web service application 121, the client application 150, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 700, or in multiple computing devices in the same computing environment 103.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying program code executable in a computing device comprising a display and at least one hardware processor that, when executed, causes the computing device to:
   access a list of items from memory of the computing device, wherein the list of items designates a plurality of items to be subject to a check-out process;
   generate a first machine-readable identifier for a first item in the list of items;
   configure at least one setting of the computing device to enable the first machine-readable identifier to be interpreted by an optical sensor of a register device when the first machine-readable identifier is shown in the display of the computing device;
   cause the first machine-readable identifier to be shown in the display of the computing device;
   while the first machine-readable identifier is shown in the display of the computing device, capture an audio signal using a microphone of the computing device to identify a predetermined tone emitted by the register device in response to a scan of the first machine-readable identifier;
   while the first machine-readable identifier is shown in the display, identify the predetermined tone in the audio signal indicative of the scan of the first machine-readable identifier being performed by the register device; and
   in response to the predetermined tone in the audio signal being identified:
      cause the first machine-readable identifier to be removed from the display; and
      cause a second machine-readable identifier to be shown in the display in place of the first machine-readable identifier, wherein the second machine-readable identifier is generated by the computing device for a second item in the list of items.

2. The non-transitory computer-readable medium of claim 1, wherein the at least one setting adjusted comprises a brightness of the display, wherein the brightness of the display is adjusted prior to the first machine-readable identifier or the second machine-readable identifier being shown in the display.

3. The non-transitory computer-readable medium of claim 1, wherein the first machine-readable identifier and the second machine-readable identifier comprise at least one of: a matrix code, a barcode, or a tag code.

4. A system, comprising:
   a mobile computing device comprising a display, a microphone, and at least one hardware processor; and
   program instructions executable in the mobile computing device that, when executed, cause the mobile computing device to:
      configure at least one setting of the mobile computing device to enable a first machine-readable identifier to be interpreted by an external device when the first machine-readable identifier is shown in the display of the mobile computing device;
      cause a first user interface that comprises a first machine-readable identifier for a first item to be shown in the display of the mobile computing device;
      while the first machine-readable identifier is shown in the display of the mobile computing device, analyze an audio signal captured by the microphone of the mobile computing device to identify a similarity between the audio signal and a predetermined tone that indicates that the first machine-readable identifier has been read by the external device; and in response to the first machine-readable identifier having been read by the external device:
cause the first user interface that comprises the first machine-readable identifier to be removed from the display; and
cause a second user interface that comprises a second machine-readable identifier for a second item to be shown in the display.

5. The system of claim 4, further comprising program instructions executable in the mobile computing device that, when executed, cause the mobile computing device to access a list of items from a remote computing device over a network subject to a checkout process, wherein the list of items comprises the first item and the second item.

6. The system of claim 5, wherein the first machine-readable identifier having been read by the external device is further identified by:
identifying a presence of red light generated by the external device using a front-facing camera of the mobile computing device; or
detecting movement of the mobile computing device using at least one accelerometer or at least one gyroscope of the mobile computing device.

7. The system of claim 5, further comprising program instructions executable in the mobile computing device that, when executed, cause the mobile computing device to cause playback of an audio tone in a speaker associated with the mobile computing device indicative of the checkout process being complete.

8. The system of claim 5, further comprising program instructions executable in the mobile computing device that, when executed, cause the mobile computing device to:
store a current device setting as detected from the mobile computing device; and
adjust the current device setting to optimize the mobile computing device for the checkout process.

9. The system of claim 8, wherein the current device setting is adjusted to optimize the mobile computing device for the checkout process comprises at least one of: adjusting a gain level for a microphone prior to an audio signal being captured by the microphone and adjusting a brightness level for the display.

10. The system of claim 6, wherein the external device is a cash register configured to emit the tone in response to a scan of the first machine-readable identifier or the second machine-readable identifier when the mobile computing device is positioned in a face down position on a scanning surface of the external device.

11. The system of claim 6, wherein the external device is a handheld reader device configured to emit the tone in response to a scan of the first machine-readable identifier or the second machine-readable identifier.

12. The system of claim 4, further comprising program instructions executable in the mobile computing device that, when executed, cause the mobile computing device to adjust a brightness of the display prior to showing the first user interface or the second user interface in the display.

13. The system of claim 4, wherein the external device is configured to read the first machine-readable identifier and the second machine-readable identifier when the mobile computing device is in a face down position where the display of the computing device faces a surface sensor of the external device.

14. A computer-implemented method, comprising:
Detecting, by a client device that comprises at least one hardware processor, an orientation of the device, wherein orientation of the client device indicates that a display of the client device is in a face down position on a surface of an external device;
configuring, by the client device, at least one setting on the client device to enable a first machine-readable identifier to be interpreted by a sensor of the external device when the first machine-readable identifier is shown in the display of the client device;
displaying, by the client device, a first user interface that comprises a first machine-readable identifier for a first item in the display;
while the client device is displaying the first user interface in the face down position, capturing, by the client device, an audio signal using a microphone of the client device to determine that the first machine-readable identifier has been read by the external device;
analyzing, by the client device, the audio signal to identify a predetermined tone in the audio signal indicative of the first machine-readable identifier being read by the external device; and
in response to the predetermined tone in the audio signal being identified:
removing, by the client device, the first user interface that comprises the first machine-readable identifier from the display; and
displaying, by the client device, a second user interface that comprises a second machine-readable identifier for a second item in the display.

15. The computer-implemented method of claim 14, further comprising:
determining, by the client device, that no additional item exists in a list of items that requires being read by the external device; and
in response to no additional item existing in the list of items, causing, by the client device, playback of a sound in a speaker of the client device that indicates completion of a checkout process.

16. The computer-implemented method of claim 15, further comprising:
storing, by the client device, a setting of the client device currently active;
adjusting, by the client device, the setting of the client device to an optimized setting; and
in response to no additional item existing in the list of items, reverting, by the client device, the optimized setting to the setting.

17. The computer-implemented method of claim 16, wherein adjusting the setting of the client device to the optimized setting comprises at least one of: adjusting a volume level for the microphone prior to the audio signal being captured by the microphone and adjusting a brightness level for the display.

18. The computer-implemented method of claim 17, wherein analyzing, by the client device, the audio signal to identify the predetermined tone further comprises:
attempting, by the client device, to detect the predetermined tone within a threshold period of time; and
in response to the predetermined tone being not detected within the threshold period of time, adjusting, by the client device, the optimized setting to another setting.

19. The computer-implemented method of claim 14, wherein analyzing, by the client device, the audio signal to identify the predetermined tone in the audio signal further comprises generating a first fingerprint for the audio signal and comparing the first fingerprint to a second fingerprint stored in memory of the client device.

20. The computer-implemented method of claim 14, wherein the external device is an electronic cash register configured to emit the predetermined tone in response to a scan of the first machine-readable identifier or the second machine-readable identifier.

* * * * *